United States Patent [19]

Chu

[11] Patent Number: 5,029,955
[45] Date of Patent: Jul. 9, 1991

[54] OPTICAL SCANNER

[75] Inventor: Ching Chu, Mississauga, Canada

[73] Assignee: Optical Recording Corporation, Toronto, Canada

[21] Appl. No.: 512,186

[22] Filed: Apr. 20, 1990

Related U.S. Application Data

[63] Continuation-in-part of Ser. No. 388,376, Aug. 2, 1989.

[51] Int. Cl.⁵ .................... G02B 26/08; G11B 7/00
[52] U.S. Cl. .................... 350/6.5; 369/44.11; 369/110
[58] Field of Search .................... 350/6.1, 6.2, 6.3, 6.4, 350/6.5, 3.7, 254, 3.71; 369/44.11–44.12, 44.14, 44.17–44.23, 44.28, 110

[56] References Cited

U.S. PATENT DOCUMENTS

| | | | |
|---|---|---|---|
| 3,501,586 | 3/1970 | Russell | 369/44 |
| 3,624,284 | 11/1971 | Russell | 369/44 |
| 3,795,902 | 3/1974 | Russell | 369/59 |
| 4,428,643 | 1/1984 | Kay | 350/3.71 |
| 4,557,564 | 12/1985 | van Rosmalen | 350/247 |
| 4,583,816 | 4/1986 | Kramer | 350/3.71 |
| 4,616,355 | 10/1987 | Kasahara | 369/45 |
| 4,650,294 | 3/1987 | Nanno et al. | 350/6.3 |
| 4,688,201 | 8/1987 | Towner et al. | 369/44 |
| 4,730,297 | 3/1988 | Ishibashi et al. | 369/110 |
| 4,773,062 | 9/1988 | Wada et al. | 369/44 |
| 4,794,580 | 12/1988 | Ikedo et al. | 369/44 |
| 4,844,568 | 7/1989 | Suzuki et al. | 350/6.2 |
| 4,861,144 | 8/1989 | Russell | 350/6.3 |

FOREIGN PATENT DOCUMENTS

| | | |
|---|---|---|
| 2022265 | 11/1971 | Fed. Rep. of Germany. |
| 2203840 | 8/1973 | Fed. Rep. of Germany. |
| 2215076 | 10/1973 | Fed. Rep. of Germany. |

OTHER PUBLICATIONS

Ishibashi et al., "High Speed Accessing Magneto-Optical Disk Drive", 1988, pp. 8–15, SPIE, vol. 899, Optical Storage Technology and Applications.
German patent 595,822, Feb. 10, 1932.
German Patent Abstract 55113018, Feb. 23, 1979.
Japanese Patent Abstract 63307419, Dec. 15, 1988.

*Primary Examiner*—Rodney B. Bovernick
*Assistant Examiner*—James Phan
*Attorney, Agent, or Firm*—Fleit, Jacobson, Cohn, Price, Holman & Stern

[57] ABSTRACT

An optical scanner has a light distributor rotating about an axis spaced from but parallel to the optical axis of at light source. Lenses are mounted on a carrier that rotates about the optical axis. The distributor and carrier rotate a the same angular velocity and are arranged so that the lens and associated distributor move across the media at the same time. By rotating the lens about the optical axis, the scanning beam remains in the central zone of the lens as it passes across the media.

18 Claims, 6 Drawing Sheets

OPTICAL SCANNER

BACKGROUND OF THE INVENTION

This application is a continuation-in-part of application Ser. No. 07/388,376 filed on Aug. 2, 1989.

The present invention relates to an optical scanning device.

Optical scanners are used in a wide variety of applications to convert information that appears as changes in light intensity into electrical signals and vice versa. The information may be in analogue form but one of the most demanding applications is the recordal and retrieval of digital data.

The recording and retrieval of data on an optical media in digital form provides significant advantages in terms of data storage density, permanence and retrievability. The most common form of data storage using digital optical recording techniques utilizes a record media in the form of a disk that is rotated beneath an optical head to record and/or read data on the media. This arrangement has enjoyed considerable success, particularly in the audio field, but does pose limitations in terms of the media format.

An alternate format that offers significant advantages in certain application areas is a card format in which the media is held stationery and the optical beam reading the media is moved or scanned across the media. This allows different formats and sizes of media to be used, most conveniently a format corresponding to that of the popular size of credit card.

Similarly, a continuous tape offers advantages in certain applications such as archival recording and very high data storage capabilities.

In order to attain high data rates and data densities, it is preferable to utilize a rotatable scanner that causes an optical beam to translate relative to the record to read and record data. Such devices are disclosed in U.S. Pat. No. 3,501,586 issued Mar. 17, 1978; U.S. Pat. No. 3,624,284 issued Nov. 30, 1971; and U.S. Pat. No. 3,795,902 issued Mar. 5, 1974 all to Russell. In German Offenlegungshrift DOS 2,022,265 issued Nov. 18, 1971 published to Siemens, a scanning device is disclosed that utilizes a multi-faceted pyramid rotated about its central axis that serves to displace radially a light beam to an objective lens to scan a media. The device disclosed in this patent provides a simple yet effective distribution apparatus but as higher data density is required, conflicting mechanical and optical requirements introduce undesirable error in the scanning process. As the planar facet of the pyramid rotates, the point of impingement of the light beam on the face of the pyramid varies, causing the optical axis of the light beam to move across the aperture of the objective lens. This causes the beam to illuminate the outer zone of the lens during part of the scan with a resultant loss in quality of the optical system.

U.S. Pat. No. 4,163,600 issued Aug. 7, 1979 to Russell addresses these problems by introducing a back angle between the light beam and the pyramidal mirror that reduces movement of the light beam across the objective lens. A further approach to reducing the movement of the optical axis relative to the lens is shown in co-pending application Ser. No. 162,299 now U.S. Pat. No. 4,861,144 in which a field correction lens is used to generate a virtual image co-incident with the axis of rotation of the scanner. Each of these proposals does produce benefits but nevertheless at the high density and data rates required for optical storage devices, a simpler approach is preferable.

It is therefore an object of the present invention to provide an optical scanning device in which the above disadvantages are obviated or mitigated.

SUMMARY OF THE INVENTION

According the present invention there is provided a rotary optical scanning device to cause a light beam to scan a media comprising a light source to project said beam along an optical axis, and impinge on a distributor, the distributor displacing radially the beam from said first optical axis and projecting the beam along a second optical axis substantially parallel to said first optical axis, a carrier having an optical element mounted thereon to receive said beam from said distributor and to control impingement of said beam on said media, said carrier being rotatable about an axis coincident with said first optical axis and said distributor being rotatable about an axis displaced from said optical axis and means to maintain said optical element coincident with said second optical axis as said carrier and distributor rotate and move said light beam across said media.

By separating the axis of rotation of the carrier and the light distributor, the optical element, typically a lens, mounted on the carrier may rotate about the optical axis of the light beam and so is always illuminated by the optical beam in its central zone. Movement of the beam across the lens is minimized.

It is preferred that multiple distributors and optical elements are utilized to provide successive scans of the media as the scanner rotates through 360 degrees.

BRIEF DESCRIPTION OF THE DRAWINGS

Embodiments of the invention will now be described by way of example only with reference to the accompanying drawings in which.

DETAILED DESCRIPTION

Figure 1:
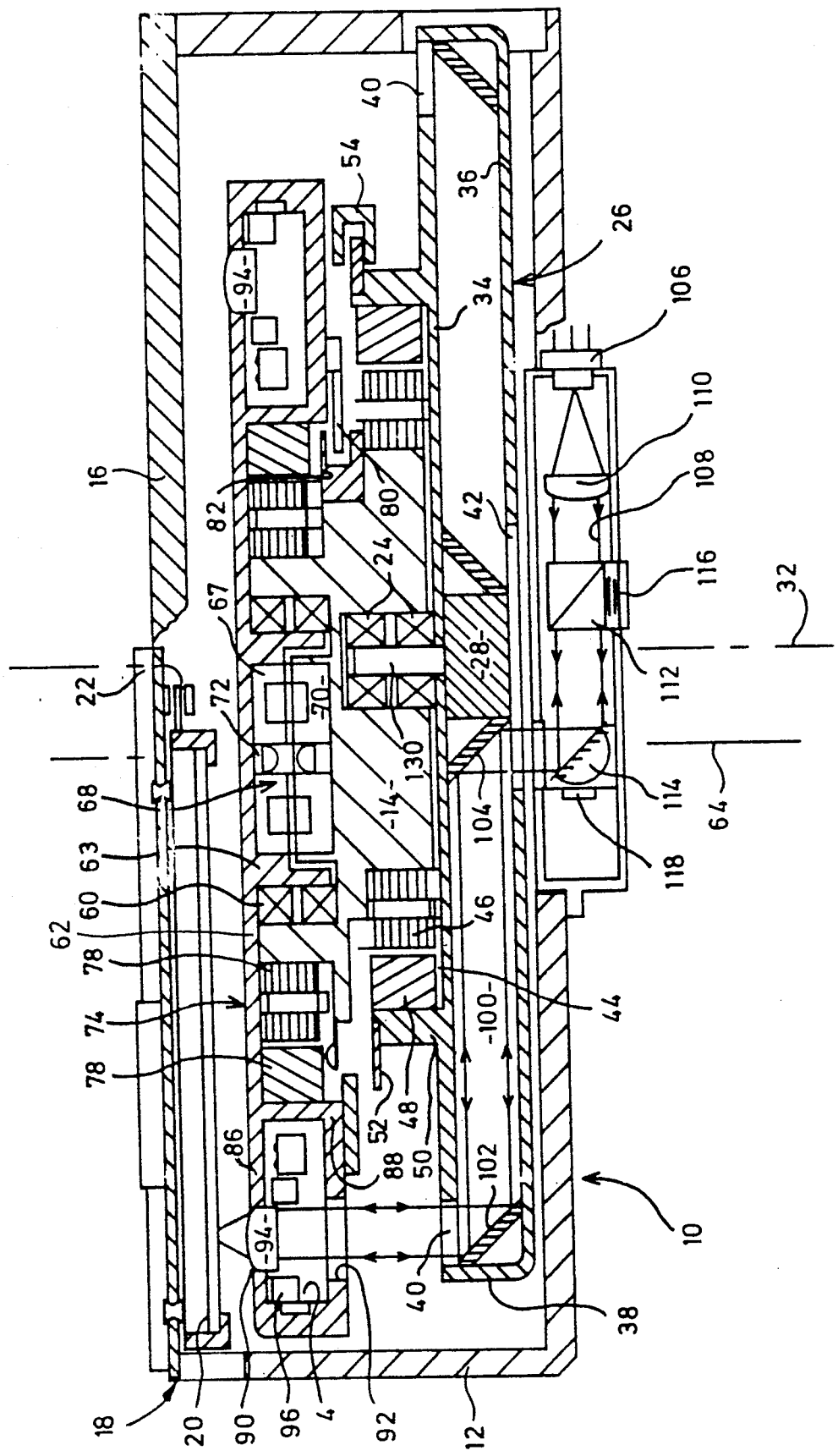
FIG. 1 is a sectional view of a optical scanner.

Referring therefore to FIG. 1, an optical scanner generally designated 10 includes a housing 12 with a support frame 14 extending between the side walls of the housing 12. The housing 12 includes an upper closure member 16 that carries a card transport mechanism generally indicated at 18. As shown in FIG. 1, the card transport mechanism 18 is designed to accomodate an optically recordable and readable card 20 and is supported in the transport mechanism 18 for incremental movement in the direction indicated by arrow A. The location of the card 20 is monitored by a position encoder 22. The specific details of the card transport mechanism do not form part of the present invention and will therefore not be described further.

The frame 14 rotatably supports an optical beam distribution assembly generally designated 26 through bearings 24. The assembly 26 comprises a central hub 28 having a spindle 30 receive the bearings 24 so as to be rotatable about an axis 32. The distributor assembly 26 further comprises upper and lower spaced disk members 34,36 respectively, mounted on opposite sides of the hub 28. The lower disk member 36 has an upturned peripheral flange 38 extending to the upper disk member 34. Disk member 34 has four notches 40 uniformly distributed around its periphery and the lower disk member 36 includes a central aperture 42 co-axial with the hub 28 so that the lower disk member 36 is in fact supported by the upper disk member 34.

The disk assembly 26 is rotated by a motor 44 disposed between the frame 14 and the upper disk member 34. The motor 44 includes a winding assembly 46 secured to the frame 14 and a magnetic core 48 secured to an upstanding annular flange 50 on the upper surface of the disk member 34. A radial extending encoder disk 52 is secured to the flange 50 and co-operates with a detector assembly 54 to monitor the rotation of the disk assembly 26 relative to the frame 14.

The frame 14 also rotatably supports on bearings 60 a circular carrier assembly indicated generally at 62. The carrier assembly 62 includes a downwardly-projecting annular shoulder 63 engaging the bearing 60 to locate the assembly 62 for rotation about an axis 64. Located within the shoulder 63 is the secondary winding 67 of a rotary transformer generally indicated at 68. The primary winding 70 is located on the frame 14. An opto-electric coupling 72 is located at the centre of the primary and secondary windings 70, 67 respectively on the axis 64. The rotary transformer 68 permits power to be transferred from the stationery frame 14 into the rotating carrier assembly 62 and similarly the opto electric coupling 72 permits data to be transferred between the stationery and rotating components.

Rotation of the disk assembly 62 is provided by a motor 74 with the windings 76 located on the frame 14 and the magnetic core 78 secured to the disk assembly 62. Rotational control of the disk assembly 62 is provided by an encoder ring 80 secured to the disk assembly 62 and a detector assembly 82 secured on the frame 14.

A cavity 84 of rectangular cross-section is formed on the periphery of the disk assembly 62 with spaced upper and lower surfaces 86,88 respectively. Aligned apertures 90,92 are formed in the upper and lower surfaces 86,88. A lens 94 is mounted by means of a focusing servo 96 in the aperture 90 and is movable in a direction normal to the plane of the disk assembly 62 to effect focusing on the card 20 in response to data signals provided through the opto-electric link 72.

The lens 94 receives light from one of four distributors 100 mounted on the distributor assembly 26 and uniformly distributed about the assembly 26 at 90 degree intervals. Each distributor 100 comprises a pair of planar mirrors 102,104 that are arranged parallel to one another and are disposed 45 degrees to the axis of rotation 32 of the distributor 26. A coherent light beam is provided to the distributor 100 from a laser diode 106 that emits a light beam indicated at 108 and passes through a columnating lens 110 and beam splitter 112 to a galvanometer mirror 114. The galvanometer mirror 114 is disposed at 45 degrees to the axis of rotation 64 of the carrier 62 and is rotatable about an axis orthoganal to the axis 64. The optical beam 108 is thus reflected by the mirror 114 along an optical axis co-incident with the axis of rotation 64 of the carrier 62 and onto the mirror 104. Light reflected from the record 20 is received at a photo detector 116 that converts the light signal into an electrical signal. The detector 116 also provides a tracking signal to a servo motor 118 that controls movement of the galvanometer mirror 114 to effect tracking of the light beam 108 on the record 20.

In operation, the distributor assembly 26 and carrier assembly 62 are rotated about their respective axes 32,64 by motors 44,74 respectively. The rotation is controlled by means of the encoders 52,80 and their respective pickups 54,82 so that they rotate at the same angular velocity. Comparison of the outputs of pickups 54,82 provide an error signal that is used to adjust the rotation of one of the assemblies and maintain it in synchronism with the other assembly both as to relative velocities and position.

Figure 2:
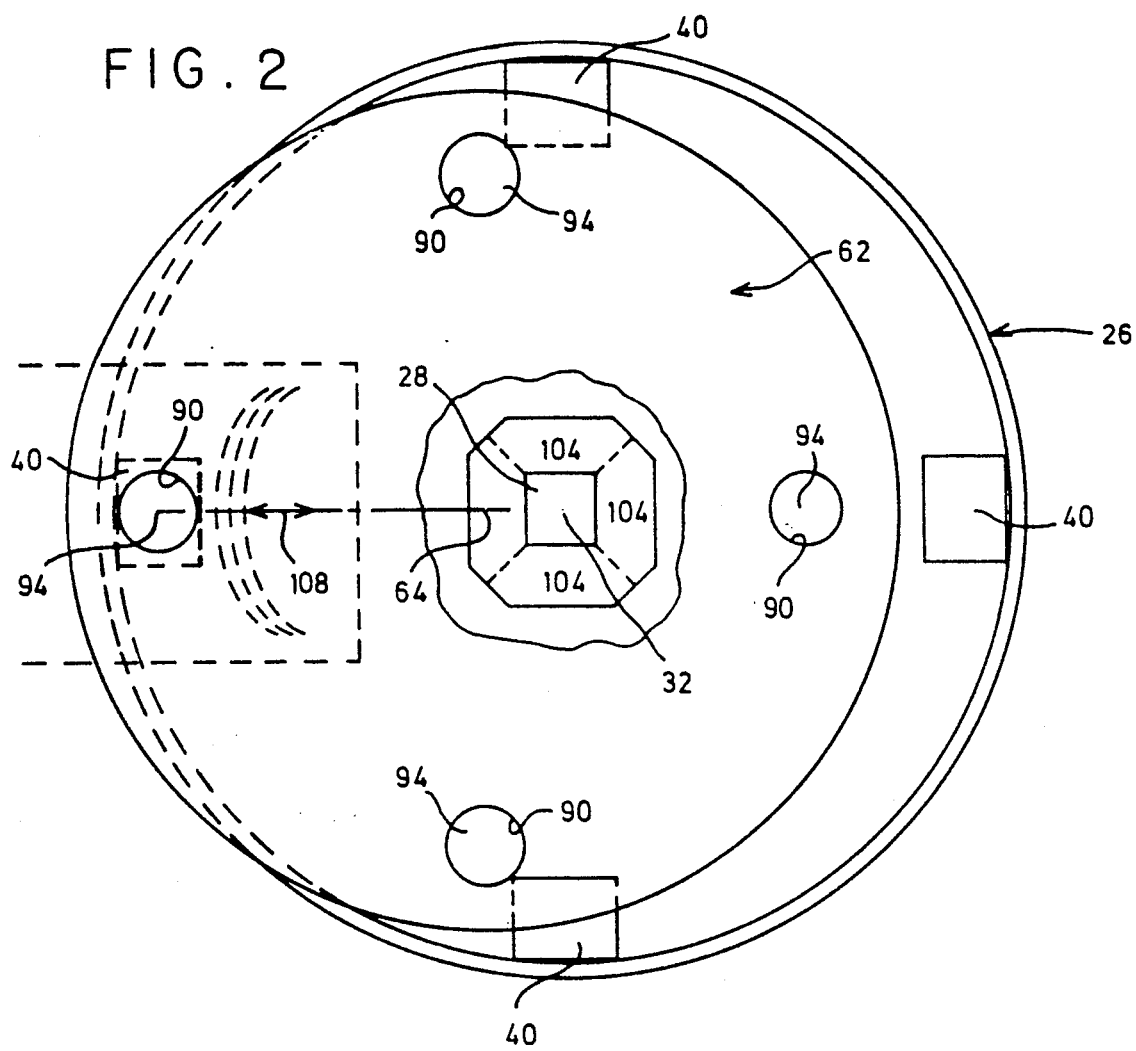
FIG. 2 is a plan view of the device shown in FIG. 1 taken on the line 2—2.
Figure 3:
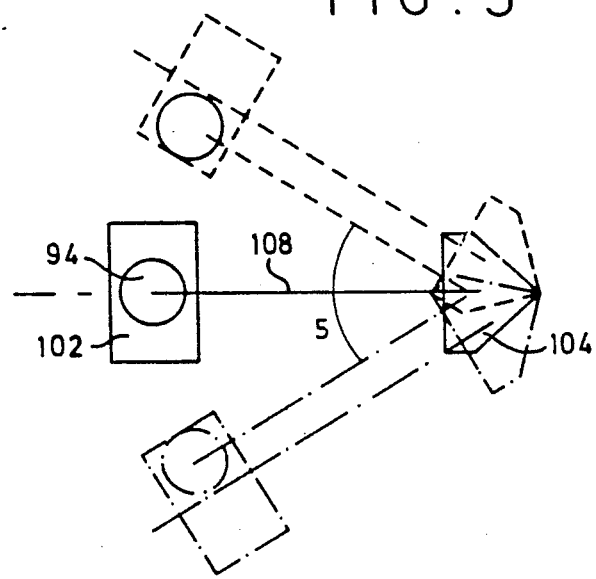
FIG. 3 is a schematic representation of a portion of the device shown in FIG. 2 showing alternative positions of the elements during movement of the scanner.

As may best be seen in FIG. 2, the distributor assembly 26 and carrier assembly 62 are arranged so that over an arc of rotation indicated by the arc "S" in FIG. 3, the aperture 92 in the carrier assembly 62 overlies the aperture 40 in the distributor assembly 26. In the embodiment shown, the arc "S" subtends an angle of approximately 60 degrees although this may vary according to application. Over the arc "S", the mirror 104 and lens 94 are thus aligned so that light reflected from the mirror 102 passes through the lens 94 onto the record 20. In order to record data on the record 20, assuming it is a recordable media, the laser 106 is modulated by a digital data stream and a correspondingly modulated optical beam passes through the lens 110 and beam splitter 112 to be reflected by the galvanometer mirror 114 along the optical axis co-incident with the axis 64. The optical beam is reflected and radially displaced by the mirror 104 in the distributor 100 and is subsequently reflected by the mirror 102 along an optical axis radially spaced but parallel to the axis 64. The optical beam passes through the aperture 40 in the distributor assembly 26 and aperture 92 in the carrier assembly 62 to impinge on the lens 94 and be focused onto the record 20. As the beam moves across the record 20 due to rotation of the distributor 100 and lens 94, the incident radiation modulates the light-sensitive record 20 to record in an arcuate track a digital data stream corresponding to that provided to the laser 106.

In order to read data from the record 20, the laser 106 maintains a continuous light beam which is fed along the same optical path to illuminate the surface of the record 20. The digital data recorded on the record 20 as reflective and non-reflective areas modulates the light beam which passes back along the same optical path to be diverted by the beam splitter 112 into the detector 116. The detector 116 converts the modulated light beam into an electrical signal to reconstruct the data recorded on the record 20.

Figure 4:
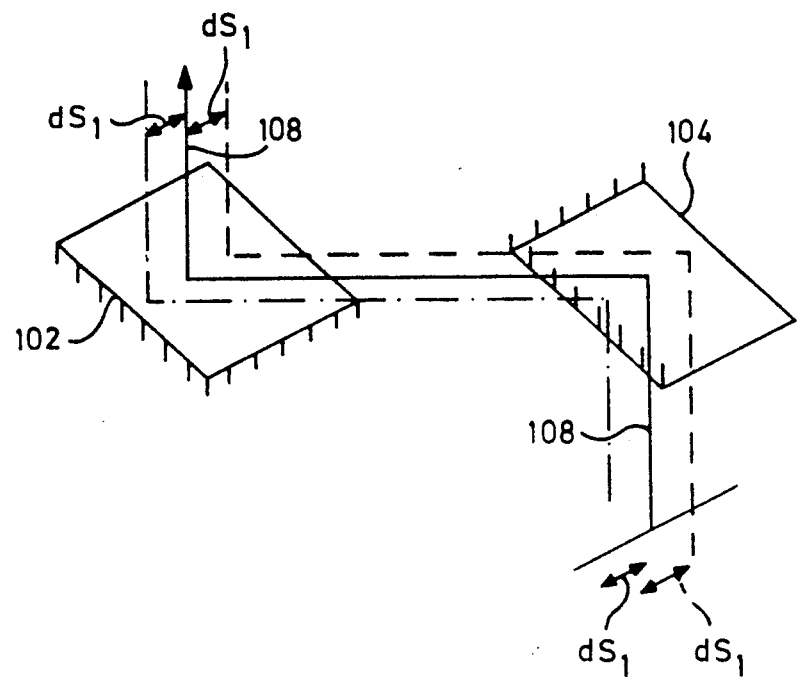
FIG. 4 is a perspective view of the elements shown in FIG. 3 showing alternative light transmission paths.

The position of the carrier 62 relative to the distributor assembly 26 ensures that the light beam incident on the lens 94 remains in the central zone of the lens 94 as it passes through the arc "S". As may be seen in FIGS. 3 and 4, the distributor 100 provides a pair of spaced parallel reflective surfaces and it is characteristic of such an arrangement that a displacement of a light source relative to one surface results in a corresponding and equal displacement of the optical beam reflected by the other surface. Thus, as shown in FIG. 4, a lateral displacement $dS_1$ of the optical beam relative to the mirror 104 produces a corresponding lateral displacement $dS_1$ at the mirror 102. As the mirror 104 rotates with the hub 28 of the carrier assembly 26, the optical beam progressively moves across the mirror 104 with a corresponding displacement of the optical beam relative to the mirror 102. If, as shown in the prior art referred to above, the lens 94 rotates about the same axis as the distributor 26, a similar lateral displacement of the beam relative to the lens 94 would occur, resulting in the periphery of the lens 94 being illuminated. By contrast, in the arrangement described in FIGS. 1-4, the lens carrier 62 is caused to rotate about the axis 64 which is co-incident with the optical axis of the light beam co-incident on the mirror 104. As such, the optical beam 108 originates at the centre of rotation of the lens 94 and is substantially co-incident over the arc "S" with the central zone of the lens 94. By virtue of the complementary lateral displacements of the beam 108 by the mirrors 104,102, the optical axis of the beam 108 that impinges on the lens 104 remains at the axis of rotation 64 of the carrier assembly 62 and thereby remains substantially constant within the centre of the lens 94. The optical beam therefore traces an arcuate path across the surface of the record 20 with successive lenses 94 generating successive arcs. The card 20 is moved incrementally between successive passes of the lenses 94 to allow for separation of the data tracks.

The focusing of the beam 108 on the record 20 is provided by the focusing actuator 96 that utilizes control signals derived from the detector 116 in conventional manner and provided through the opto-electric coupler 72. Similarly, the tracking of beam 108 across the surface of the card 20 may be adjusted by the galvanometer mirror 114 operating through the servo motor 118 from control signals derived from the detector 116. Rotation of the mirror 114 changes the angle of incidence of the optical axis on the mirror 104 and produces a corresponding inclination of the beam 108 to the lens 94 which causes radial displacement of the focal point of the beam relative to lens 94 and record 20. This permits adjustment of the beam to compensate for variations between cards and their mounting within the transport mechanism 18. Such displacement is also constant relative to the card over the scan of the beam 108 to simplify tracking. As an alternative to the tracking mirror 114, it is possible to control both focus and tracking through actuator 96 which would tilt lens 94 to move radially the focal point of the beam 108.

Similarly, the tracking signal could be provided by a beam splitter located on the carrier in the path of the beam 108 and associated detector to measure the energy distribution of the beam 108 and adjust its position accordingly.

It will be seen, therefore, that providing the carrier assembly 62 with an axis of rotation co-incident with the optical axis and displaced from the axis of rotation of the distributor 26 a simple yet effective mechanism is provided which maintains the optical beam in the central zone of the lens 94 as the assembly passes through the scanning arc.

Figure 5:
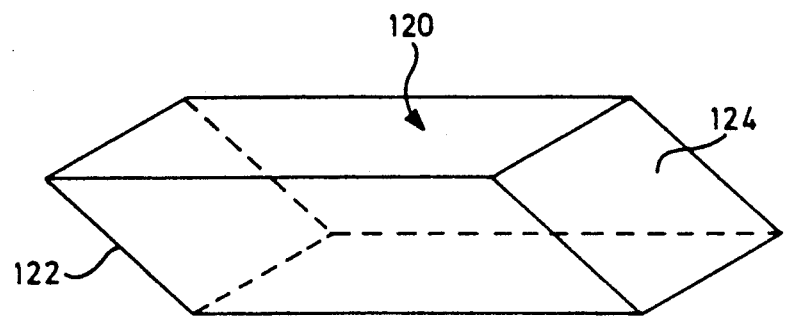
FIG. 5 is a view similar to FIG. 4 showing an alternative embodiment of the elements shown in FIG. 4.

It will be apparent that alternative arrangements may be provided for the distributor 100 and in particular the pair of mirrors 102,104 may be replaced by a parallel-piped prism 120 as shown in FIG. 5 with inclined end faces 122,124 to deflect the beam 108. Moreover, such a prism could be formed as an integrally molded spider with four or more arms to reduce the manufacturing costs of the assembly. An alternative arrangement of scanner is shown in FIG. 6 in which light components have been identified with light reference numerals with the suffix "a" added for clarity.

Figure 6:
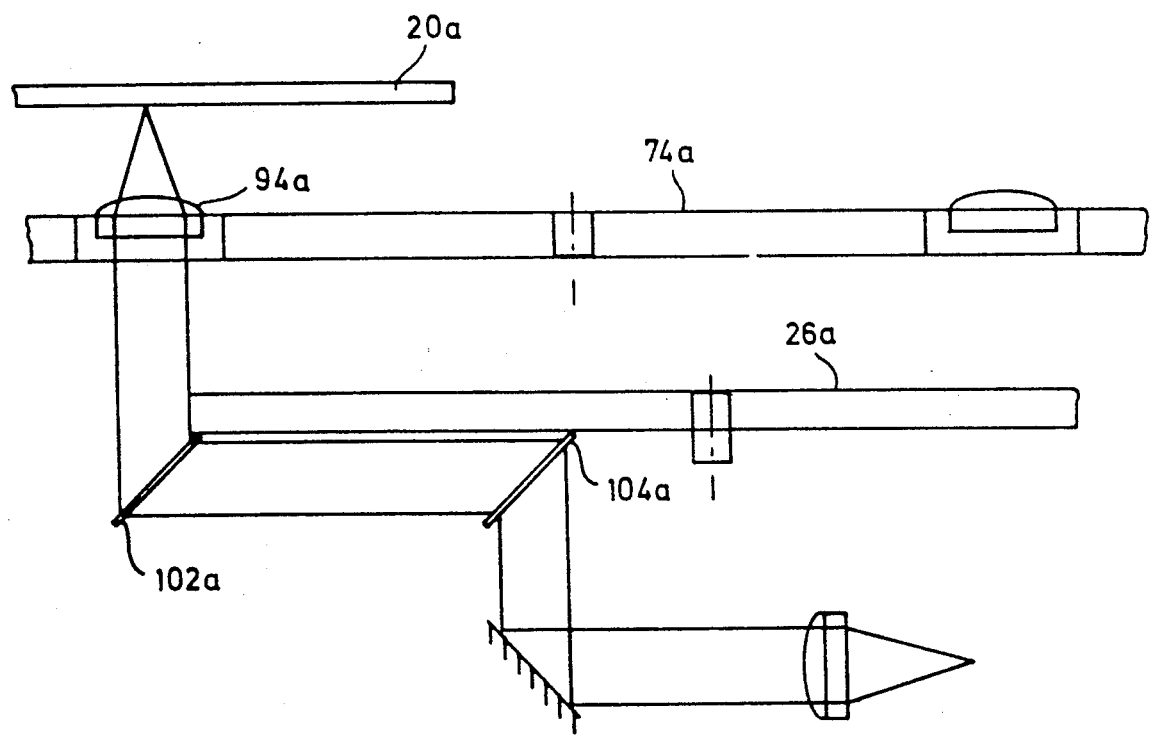
FIG. 6 is a schematic representation of an alternative form of scanner.

In the embodiment of FIG. 6, the mirrors 102,104 are replaced with holograms 102a,104a disposed 45 degrees to the incident light beam 108a. An optical path equivalent to that obtained with the mirrors 102,104 is produced to maintain illumination of the lens 94a.

The use of holographic transmissive elements leads to a slight reduction in the energy transmission but does make the device more tolerant to minor misalignments during manufacture.

Figure 7:
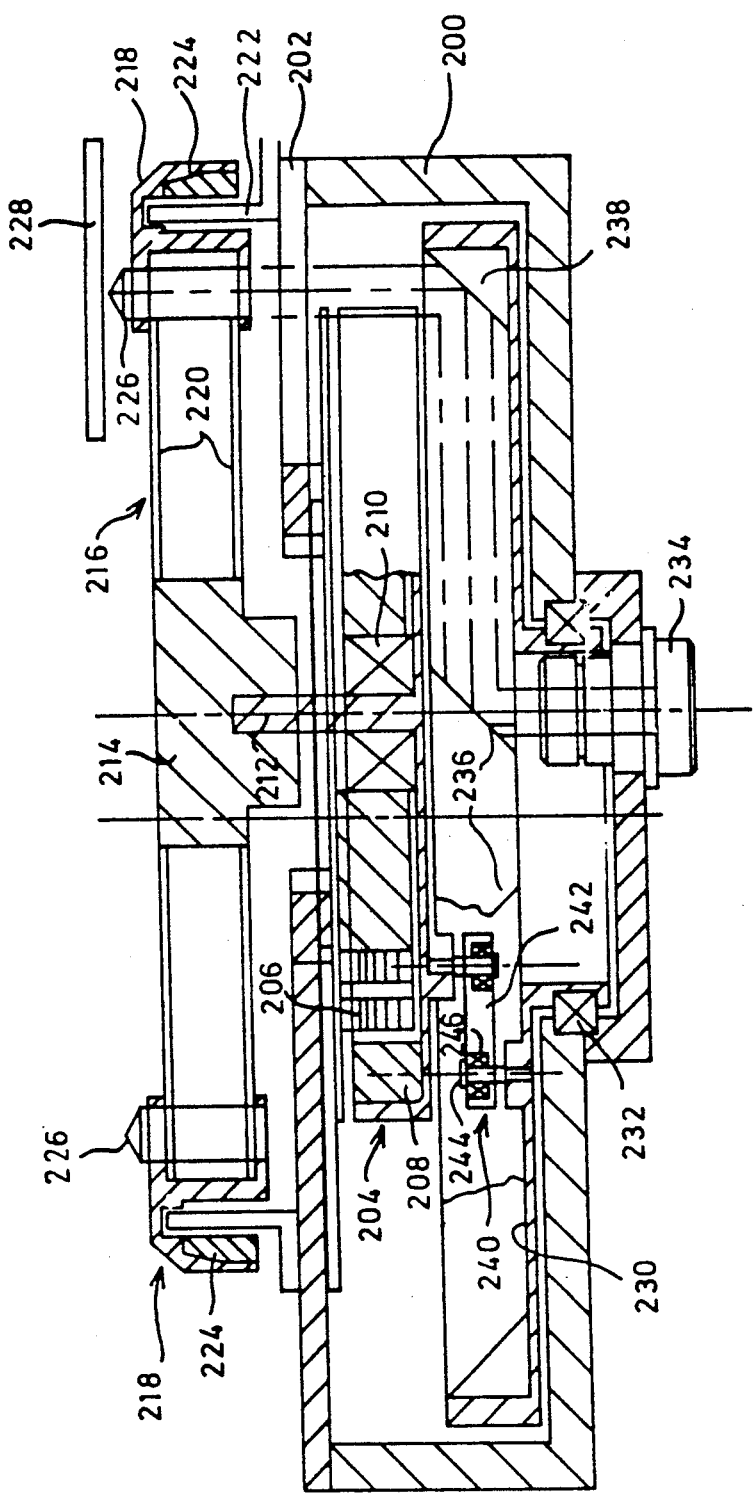
FIG. 7 is a sectional elevation of a yet further embodiment of the scanner.
Figure 8:
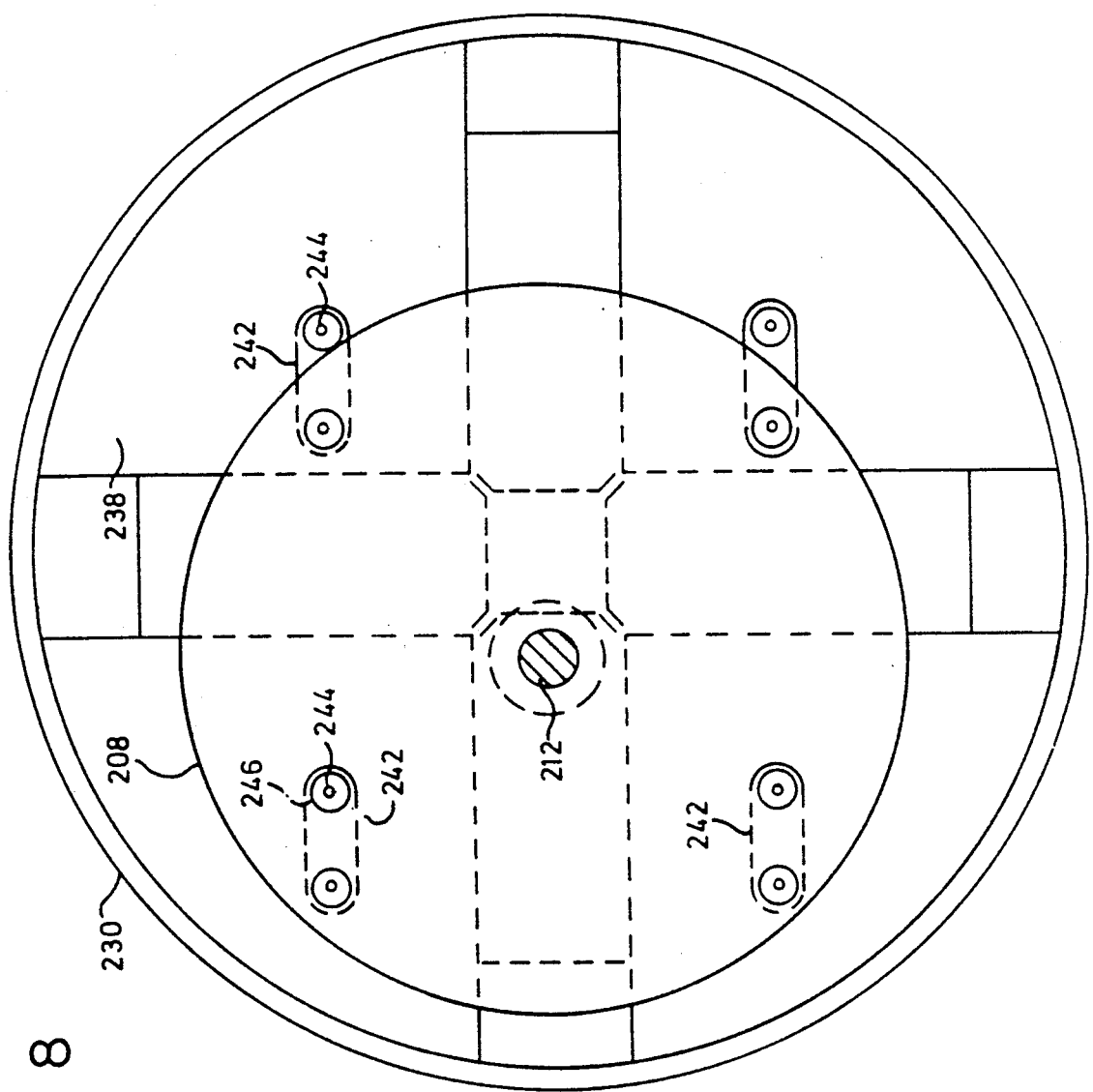
FIG. 8 is a schematic plan view of FIG. 7.

A further embodiment of the scanner is shown in FIGS. 7 and 8 in which a single motor is used and the carrier and distributor are interconnected by mechanical linkage. In the embodiment of FIGS. 7 and 8, housing 200 has a partition 202 to support a motor assembly 204. The motor assembly includes a stator 206 supported on the partition 202. Rotor 208 of the motor 204 is supported in bearings 210 on the partition 202 and has a spindle 212 projecting through the partition for engagement with the hub 214 of the carrier 216. Carrier 216 is similar to that described in our copending application Ser. No. 07/440,695 in which full details of the operation of the carrier 216 is described. A detailed description of the carrier is contained in the prior application, the details of which are incorporated herein by reference. The carrier 216 includes a plurality of lens carriers 218 distributed uniformly about the circumference of the carrier and each connected to the hub 214 by a pair of suspension arms 220. The arms 220 allow limited flexure in the vertical direction but are bifurcated to resist torsional deflection about the hub. As more fully described in the prior application, vertical movement of the lens carrier 218 is controlled by means of a coil 222 extending around the periphery of the carrier and co-operating with magnetic elements 224 mounted on the lens carrier 218. Variations in the current supplied to the coil 222 causes vertical movement of the carrier 218 to adjust the position of the carrier along the axis of rotation of the carrier. Carrier 218 supports a lens element 226 which causes impingement of the optical beam on the card 228. The details of the card transport mechanism are omitted from FIG. 7 for clarity.

Distributor assembly 230 is rotatably mounted in the housing 200 by means of bearings 232. An optical head 234 containing a light source and tracking elements is mounted on the housing 200 and directs a light beam at the first of the pair of inclined mirrors 236,238 carried by the distributor assembly 230.

To maintain the distributor 230 and carrier 216 in unison, a mechanical linkage generally indicated at 240 extends between the rotor 208 and the distributor assembly 230. As can best be seen in FIG. 8, the mechanical linkage 240 includes four bars 242, each pivotally connected at one end to the rotor 208 and at the opposite end to the distributor 230. The connections are by means of pins 244 received in pre-loaded bearings 246. The pivotal connection of the links 242 to the rotor 208 is arranged to be equidistant from the axis of rotation of the rotor 208 and uniformly spaced about that axis. Similarly, the connections of the links 242 to the distributor are also equidistant from the axis of rotation of the distributor and also uniformly spaced about the axis. The length of the links 242 therefore corresponds to the offset between the axis of rotation of the carrier and distributor. As can be seen in FIG. 8, the links 242 are arranged in the sectors between the optical path of the mirror pairs of the distributor so that they do not interfere with the optical system.

The links 242 ensure that upon rotation of the rotor 208, a conjoint rotation of the distributor 230 occurs. The pre-loaded bearings 246 minimize any play in the links 242 and a consideration of the locus of the attachment points during one full rotation will show that the links 242 remain parallel to one another and maintain their orientation relative to the housing so that torsional loads are not imposed on the distributor or carrier due to partial rotation of the links 242. Moreover, the inertia loads in the direction of the link caused by the reversal of the direction of translation are cancelled due to the symmetry of the links to minimize vibration between the two components.

It will be seen, therefore, that the links 242 maintain the lens and the optical beam in alignment over the length of the scan and that the links provide a very simple, efficient and inexpensive mechanism to provide the conjoint rotation required between the carrier and the distributor. Moreover, the arrangement of motor disposed between the carrier and distributor provides a space-efficient arrangement for all the components of the scanner and the disposition of the links between the optical elements further maintains the overall height of the scanner within the required envelope.

I claim:

1. A rotary optical scanner to cause a light beam to scan a media comprising a light source to project said beam along a first optical axis and impinge on a distributor, rotatable about an axis displaced from the first optical axis, said distributor displacing radially said beam from said first optical axis and projecting the beam along a second optical axis substantially parallel to said first optical axis, a carrier rotatable about an axis coincident with the first optical axis and having an optical element mounted thereon to receive said beam from said distributor and to control impingement of said beam on said media, and having link means interconnecting the carrier and distributor and operable to maintain said optical element coincident with said second optical axis as said carrier and distributor rotate and move said light beam across said media.

2. A scanner according to claim 1 wherein the axes of rotation of said carrier and said distributor are parallel.

3. A scanning device according to claim 2 wherein said distributor includes a pair of radially spaced light deflection means arrange so that a displacement of said first optical axis relative to one of said light deflection means causes a corresponding and equal displacement of said second optical axis relative to the other of said light deflection means.

4. A scanning device according to claim 3 wherein said carrier and distributor rotate with a common angular velocity to maintain said second optical axis coincident with said optical element.

5. A scanning device according to claim 4 wherein said pair of light deflection means are planar reflective surfaces.

6. A scanning device according to claim 5 wherein said planar surfaces are inclined end faces of a parallelopiped prism.

7. A scanning device according to claim 5 wherein said planar surfaces are mirrors.

8. A scanning device according to claim 4 wherein said light deflecting means are holograms.

9. A scanner according to claim 4 wherein said link means includes a plurality of links, each having one end connected for rotation with said carrier and one end connected for rotation with said distributor, the connections of said links being uniformly distributed about the respective axes of rotation of said distributor and carrier.

10. A scanner according to claim 9 wherein a motor is located between said carrier and distributor, the motor having a rotor connected to one of said carrier and distributor and said rotor being connected to the other of said carrier and distributor by said link means.

11. A scanner according to claim 10 wherein said carrier is connected directly to said rotor and said distributor is connected by said links to said rotor.

12. A scanner according to claim 11 wherein a plurality of optical elements are uniformly distributed about said carrier and a distributor is associated with each of said elements, one of said links being located between each adjacent pair of distributors.

13. A scanning device according to claim 3 including light beam displacement means located between said source and said distributor and operable to adjust the impingement of said beam on said first deflection means and thereby adjust the radial position of the light beam on said media to effect tracking of said beam on said media.

14. A scanning device according to claim 13 wherein said pair of light deflection means are planar reflective surfaces.

15. A scanning device according to claim 13 wherein said optical element is adjustably positioned on said carrier to control focusing of said beam on said media.

16. A scanning device according to claim 15 wherein the position of said optical element is controlled by an actuator and control signals for said actuator are transmitted to said carrier by an opto-electronic link positioned on the axis of rotation of said carrier.

17. A scanning device according to claim 15 wherein said distributors are integrally formed as a common unit.

18. A scanning device according to claim 1 wherein a plurality of optical elements are uniformly distributed about the carrier and a distributor is associated with each of said elements.

* * * * *